Patented Sept. 27, 1927.

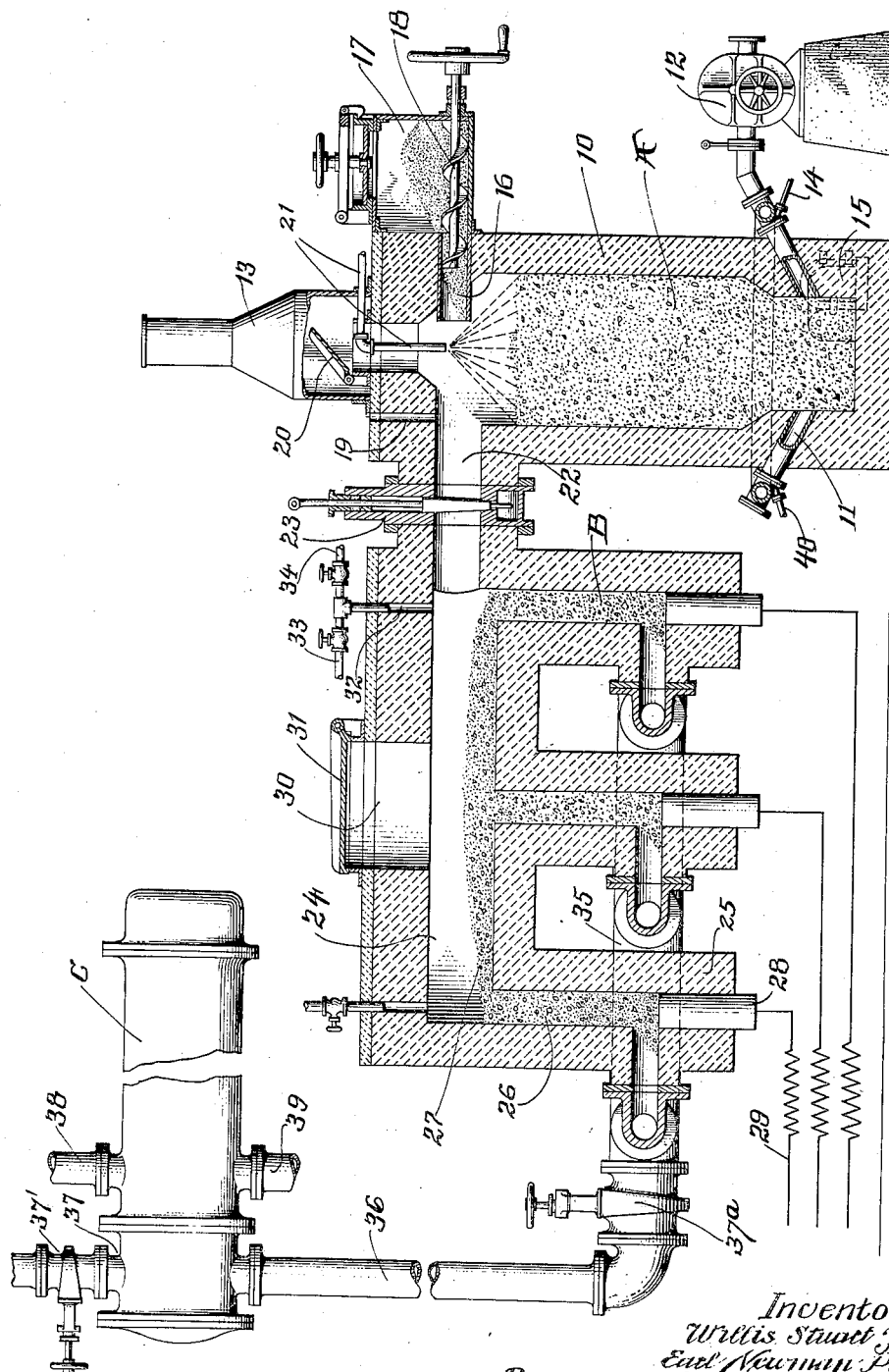

1,643,401

UNITED STATES PATENT OFFICE.

WILLIS S. YARD AND EARL NEWMAN PERCY, OF OAKLAND, CALIFORNIA.

PROCESS FOR MANUFACTURING LIGHT HYDROCARBON LIQUIDS.

Application filed March 17, 1924. Serial No. 699,616.

This invention particularly relates to the manufacture of light hydrocarbon liquids, and incidently to the production of gas by the use of heavy hydrocarbons.

More specifically the process relates to the manufacture of light hydrocarbons as benzine, gasoline and the like by the decomposition of hydrocarbon oils or of oil and steam through the medium of a reagent acting in the first instance by combustion, and the second by dry heat applied to the reagent.

At the present time heavy hydrocarbon liquids are cracked and their fractional distillation is brought about by an apparatus which does not provide intimate relation between the material and a reagent, and which of necessity requires that heat must be transmitted to the hydrocarbon liquids through containing walls. These general methods are open to the following objections:

First, at the optimum temperature most structural materials weaken and fatigue rapidly, thus making it necessary to repair and renew the parts often.

Second, the process of cracking hydrocarbon liquids tends to create deposits of carbon at points where the heat is received, thus thickening the walls of the structure and decreasing the efficiency in heat transmitted from the heating medium to the liquids.

Third, the optimum pressures required for the various reactions in the cracking of the hydrocarbon liquids cannot be effectively handled due to the weakened condition of the material forming the structure and the difficulty of transmitting heat through the carbon deposits on the walls of the passageways.

Fourth, there is personal and industrial danger and risk in operating such appliances when walls of the structures are ruptured, resulting in explosions and fires in the refinery.

Fifth, none of the present day processes can be continuously carried out due to the fact that parts must be repeatedly renewed and cleaned.

With these differences in mind it has been the principal object of the present invention to provide a method of cracking and distilling hydrocarbon liquids which shall eliminate these results by the application of certain well known principles of the oil gas art including the process of total or partial combustion of carbon in combination with a separate body of carbon heated by an electric current and with both of which bodies of carbon the hydrocarbon liquids are brought into direct and intimate contact to deliver their heat to the liquids and gases and at the same time to bring about desired results by the action of the carbon as a reagent.

It is also an object of the present invention to provide a method and means for the continuous production of light hydrocarbon liquids and gas in an economical manner, and with perfect control of the liquids and gases as distinguished from most present methods in which it is necessary to gradually increase the heat of the apparatus and to drain off the fractions of distillate and residuum.

The present invention contemplates the use of an oil cracking structure within which a body of carbonaceous material is placed, said carbon being blasted by air and oxygen and into which bed of material the heavy hydrocarbon liquids are injected, and a second unit of the apparatus to which the hydrocarbon vapors are delivered to be there subjected to the action of steam, air, and oxygen in the presence of a carbonaceous reagent heated electrically, whereby electrolytic, electro-thermic, and electro-ionic action may be produced upon the vapors.

The invention is illustrated by way of example in the accompanying drawing in which the figure is a diagrammatical view in vertical section and elevation showing an apparatus which may be used in carrying out the present invention.

Referring more particularly to the drawing, A indicates a producer, B a cracker, and C a condenser, which three units comprise the main portion of an apparatus by the use of which the present invention may be practiced.

The producer comprises a vertical cylindrical shell 10 fitted with twyers 11 through which air may be forced from a blasting blower 12 and by which air and blower an updraft is created through the shell 10 to the stack 13. Steam may also be admitted to the twyers by pipes 14 and will provide the necessary hydrogen and oxygen required to combine with the hydrocarbon in forming a desired hydrocarbon vapor agreeing in chemical formula with carbureted water gas.

In operating on hydrocarbon oils alone the structure is not provided with grates, but when solid fuels are used such grates would be required and the ashes and clinker could be removed from the bottom of the shell through a doorway 15. The carbon in a finely divided state is admitted to the top of the shell 10 through a feed opening 16 and is fed from a hopper 17 by a screw feed member 18. An observation port 19 is formed in the side wall of the shell to permit the operator to observe the conditions within the producer. A stack valve 20 is provided at the top of the producer A so that the structure may be closed during blasting and vaporization. The hydrocarbon liquid is admitted to the top of the producer and is projected downwardly by the mass of carbon by a nozzle 21. The nozzle 21 is so designed as to permit the hydrocarbon liquid to flow in a solid stream or a coarse spray so that it will form granular coke rather than lamp black as would be the case if it were finely sprayed into the producer.

An outlet throat 22 is formed in the side wall of the producer and near its upper end and communicates with the cracker B. A gate valve 23 is interposed in the outlet passageway 22 to permit the producer and the cracker to be completely separated when desired.

The oil cracking device is dependent for its flexibility of operation and economy upon the fact that electric means are provided for heating a reagent with which the hydrocarbon vapors come into intimate contact without restricting the flow of hydrocarbon vapors and liquids and thus allowing a continuous operation to take place. The oil cracker comprises a cylindrical chamber 24 of relatively shallow depth. This structure is made of suitable brick work which also forms vertically and downwardly projecting legs 25. The legs are preferably of greater length than the depth of the chamber 24, and are each formed with a central passageway 26 within which a finely divided carbonaceous material is placed, and through which the products produced in the apparatus are drawn off. The carbonaceous material not only fills the passageways 26 in the legs of the structure, but also is spread over a floor of the chamber 25 in a shallow bed 27. It will be noted that in the producer a deep bed of carbonaceous material was used, while in the cracker a shallow bed of carbonaceous material is provided in the cracker chamber.

The carbonaceous material in the cracking device is heated to a desired temperature by its resistance to a flow of electricity forming a circuit through electrodes 28 and conductors 29. In the present instance a three phased circuit is used, and one of the electrodes is mounted in the lower end of each of the legs 25 and in intimate contact with the carbonaceous material in the passageways 26. It will be evident that the brick work of the producer shall be of dielectric material and will be refractory to heat.

The top wall of the chamber 24 is formed with a central opening 30 fitted with a door 31, and also with openings 32 through which oil or oil and steam may be delivered from pipes 33 and 34. The lower ends of the passageways 26 in the legs of the cracking apparatus are connected with a manifold pipe 35 which in turn connects by pipe 36 with condenser C. A gate valve $37^a$ is interposed between the manifold pipe 35 and the condenser so that a desired pressure may be created within the apparatus as it is known that optimum results are obtained when a desired pressure is established within the apparatus.

The condenser to which the vapors are led may be of any desired type, but is here indicated as a two pass type having the vapor inlet pipe 36 and an outlet pipe 37 leading to a suitable scrubber. A cooling medium may be delivered to the condenser through a pipe 38 and drawn off therefrom through a pipe 39. The condensate will be carried away through suitable pipes and will form the light hydrocarbon liquids.

In operation of the present invention the cracking unit B is first prepared for operation by filling the passageways 26 and part of the chamber 24 with carbonaceous fuel, preferably pure oil carbon which is heated in any suitable manner until it is free from hydrocarbon, as hydrocarbons have an adverse effect upon the electrical resistance. Thereafter electric current is turned on to bring the carbon to the desired temperature. The voltage required will depend on conditions and may be from several hundred volts to a thousand volts according to the quality of the carbon and the pressure under which it is being held. While the carbon is thus being heated the producer A may be prepared by first filling it with solid fuel which may be ignited by a gas jet 40 in one of the twyers 11, the gas passing into the shell 10 with the blasted air from the pump 12. This will heat the mass of solid fuel and eventually raise it to a proper working temperature. During this heating period the gate valve 23 is closed and the stack valve 20 opened so that proper combustion will take place. When the mass of solid carbon has been raised to a proper temperature the stack valve 20 is closed and gate valve 23 is opened. Oil is then sprayed in the top of the producer through the nozzle 21 and projected downwardly against the mass of heated carbonaceous solids. This is continued until the operator observing through opening 19 sees that the gas and reagent have reached a desired temperature to form the raw unfixed gas or vapor.

These gases, vapors and colloidal solids then pass through the passageway 22 to the cracker. It will be understood that they are in an unfixed condition and that they will be acted upon in the cracker to fix them. This is done preferably by injecting steam and oil in the top of the cracker through members 32. This serves a double purpose of atomizing the oil and also of acting upon the carbon deposited within the cracker to create a chemical action converting a considerable volume of this waste carbon into gases. The steam and oil are injected into the space above the carbon contained in the cracker while the gases, vapors, and colloidal solids are passing over the top of the carbon contained in the cracker. The steam also has a solvent or washing action in preventing the tar and other products of cracking from plugging the carbon and interfering with the passage of the vapors and gases through the carbon. This reaction is believed to take place partly with the carbon forming the shallow bed in the chamber 24 and partly with the carbon in the gas rendered incandescent and nascent by the heat radiating from the carbon granules in the chamber 24. It also enters into the formation of the vapors of light hydrocarbons and of hydrogenated and partially oxidized hydrocarbons.

It will be evident therefore that a maximum volume of gas will be fixed within the cracker B and that this result is partially obtained by an electrolytic or electro-ionic action taking place upon the atoms of gas as they pass through the zone of flow of the electric current and while in intimate contact with the granular carbonaceous material heated by electro-thermic action. The operation is a continuous one, the blower 12 functioning to force the gases and vapor from vessel A through chamber B and out at the bottom of the latter.

In practice, it has proven that arcing takes place between the granular particles of the carbonaceous mass of the cracker and that at the higher voltages there is an increase in the volume and quality of gas produced out of proportion to the increase in temperature. This is of especial importance when producing polymerized products such as liquid hydrocarbons, especially under conditions of high pressure. It is evident that while a fixed gas may be produced within the cracker at a desired temperature, yet other vapors will be carried over with the gas to the condenser C where the unfixed vapors may be drawn off as condensate in the form of benzine, gasoline, and other light hydrocarbons, while the gas may be passed through a suitable scrubber to obtain tars, aldehydes, formaldehydes (both the latter with steam or air) and other hydrocarbons according to the control of the reagent used.

Attention is especially directed to the effect of operation under pressure in the present process as high pressures may be used due to the lack of danger from ruptured pipes and shells forming necessary parts of the present apparatus, and for the additional reason that a more efficient result is obtained when operating under pressure. For example, in actual experience with the present apparatus it has been found that different products and different proportions of parts have been produced at three hundred fifty pounds pressure as compared with the production at atmospheric pressure. As is generally known a cracking process tends to produce liquids at high pressures and gases at low pressures, and it would therefore appear that pressure has a considerable bearing upon the operation of the present apparatus in the production of liquids. It is also desirable to condense gases while under pressure, and for that reason a valve 37' is supplied to the outlet pipe 37 of the condenser so that the pressure of the gases within the condenser may be controlled.

The advantages of the present process may be briefly summarized as follows:

First, it enjoys all the advantages of continuous operation such as maintenance of optimum conditions, a higher rate of output, fixed and standard products, minimum investment.

Second, all the advantages of perfect control which include optimum temperature, pressure and contact with the heat supply body.

Third, the carbon, which in other processes deposits on the heating surface, in our process deposits largely in the producer where it is consumed, and somewhat in the cracker where it is gasified by steam.

Fourth the process enjoys the advantage of the catalytic action of carbon. We have experimented with various materials and find carbon to be more catalytic in its effect upon oil and oil vapors than any other resistant. A bed of carbon at optimum temperature is several times as active as any other material with which we have experimented.

Fifth, the process produces at the same time marketable gases and marketable liquids which can be standardized independently of each other.

It will thus be seen that a continuous process of producing light hydrocarbon liquids is provided which insures that a maximum production may at all times be maintained.

While we have shown the preferred form of our invention and have set forth a preferred method of practicing the same, it will be understood that various changes might be made in the steps of the process and in the construction of the apparatus without departing from the spirit of the invention as claimed.

Having thus described our invention, what we claim and desire to secure by Letters Patent is:

1. A method of treating heavy hydrocarbon liquids, which consists in spraying heavy hydrocarbon liquids upon a deep bed of solid fuel in condition of incandescence and contained within a closed chamber, whereby the liquid will come into intimate contact with the fuel and will be vaporized, thereafter passing the vapors into a second chamber over a mass of finely divided carbonaceous material electrically heated to incandescence, subjecting the vapors and the carbonaceous material to the action of steam to prevent plugging of the carbonaceous material with the products of cracking, and then passing the vapors through the carbonaceous material to bring them into intimate contact with the particles of the heated carbon and thus bring about a cracking action of the vapors.

2. A method of producing light liquid hydrocarbons and gases from heavy liquid hydrocarbons, which consists in delivering heavy liquid hydrocarbons to a bed of incandescent burning solid fuel in a vessel, then passing the resulting vapors, gases and colloidal solids over a bed of electrically heated carbon, subjecting the vapors, gases, and colloidal solids while above the electrically heated carbon to the action of steam, and then passing the said vapors, gases and colloidal solids through the electrically heated carbon to produce marketable gases and light hydrocarbons, the steam preventing the plugging of the electrically heated carbon with tar and other products of cracking.

3. A method of producing light liquid hydrocarbons and gases from heavy liquid hydrocarbons, which consists in delivering heavy liquid hydrocarbons to a bed of incandescent burning solid fuel in a closed chamber, passing the resulting vapors, gases, and colloidal solids over a bed of electrically heated hydrocarbons, subjecting the said vapors, gases, and colloidal solids to a spray of steam and oil while above the said bed of electrically heated carbon, passing the vapors, gases and colloidal solids through the bed of electrically heated carbon to produce marketable gases, the steam preventing the carbon from being plugged with tar and other products of cracking and thereafter condensing said gases, vapors and colloidal solids under pressure.

WILLIS S. YARD.
EARL NEWMAN PERCY.